(12) United States Patent
Vasishth et al.

(10) Patent No.: US 7,540,014 B2
(45) Date of Patent: May 26, 2009

(54) AUTOMATED POLICY CHANGE ALERT IN A DISTRIBUTED ENTERPRISE

(75) Inventors: Karan Vasishth, Redmond, WA (US); Kimberley Ann Hunter, Snoqualmie, WA (US); Laurie A. Brown, Stanwood, WA (US); Mark David Lawrence, Duvall, WA (US); Matthias Leibmann, Woodinville, WA (US); Michelle Beaulieu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 637 days.

(21) Appl. No.: 11/064,172

(22) Filed: Feb. 23, 2005

(65) Prior Publication Data

US 2006/0190985 A1    Aug. 24, 2006

(51) Int. Cl.
*H04K 1/00* (2006.01)
*H04L 9/32* (2006.01)

(52) U.S. Cl. .............................. 726/1; 726/6
(58) Field of Classification Search ................ 726/1–4, 726/6, 7, 22–23
See application file for complete search history.

(56) References Cited

U.S. PATENT DOCUMENTS

| | | | |
|---|---|---|---|
| 5,717,924 A | 2/1998 | Kawai | |
| 5,881,225 A | 3/1999 | Worth | |
| 6,006,328 A | 12/1999 | Drake | |
| 6,073,242 A * | 6/2000 | Hardy et al. | ........... 726/1 |
| 6,192,405 B1 | 2/2001 | Bunnell | |
| 6,334,121 B1 | 12/2001 | Primeaux et al. | |
| 6,389,589 B1 | 5/2002 | Mishra et al. | |
| 6,490,680 B1 | 12/2002 | Scheidt et al. | |
| 6,751,657 B1 | 6/2004 | Zothner | |
| 7,185,192 B1 | 2/2007 | Kahn | |
| 7,237,191 B1 | 6/2007 | Sulistio et al. | |
| 7,240,015 B1 | 7/2007 | Karmouch et al. | |
| 7,409,447 B1 | 8/2008 | Assadzadeh | |
| 2001/0034733 A1 | 10/2001 | Prompt et al. | |
| 2002/0147801 A1 | 10/2002 | Gullotta et al. | |
| 2002/0184485 A1 | 12/2002 | Dray, Jr. et al. | |
| 2003/0115179 A1 | 6/2003 | Prabakaran et al. | |
| 2003/0115322 A1 | 6/2003 | Moriconi et al. | |
| 2004/0054565 A1 | 3/2004 | Nemecek et al. | |
| 2004/0111643 A1 * | 6/2004 | Farmer | ........... 713/201 |
| 2004/0148299 A1 | 7/2004 | Teegan et al. | |
| 2004/0204949 A1 | 10/2004 | Shaji et al. | |
| 2005/0060342 A1 | 3/2005 | Farag | |
| 2005/0071359 A1 | 3/2005 | Elandassery et al. | |
| 2005/0086126 A1 | 4/2005 | Patterson | |

(Continued)

OTHER PUBLICATIONS

"Understanding Active Directory Replication", 2000, pp. 171-179.

(Continued)

*Primary Examiner*—Hosuk Song
(74) *Attorney, Agent, or Firm*—Lee & Hayes, PLLC

(57) ABSTRACT

A distributed enterprise includes a policy management module and policy library for automating policy change alerting. The policy management module and policy library are configured to list associations between published policies, published policy exceptions, and one or more systems policies, and to determine if changes to published (written) enterprise policies, published policy exceptions, or systems policies have occurred. The policy management module and policy library are also configured to notify personnel of the distributed enterprise so that appropriate actions may be implemented.

8 Claims, 4 Drawing Sheets

U.S. PATENT DOCUMENTS

| | | |
|---|---|---|
| 2005/0091269 A1 | 4/2005 | Gerber et al. |
| 2005/0139649 A1 | 6/2005 | Metcalf et al. |
| 2005/0144019 A1 | 6/2005 | Murakami et al. |
| 2005/0149450 A1 | 7/2005 | Stefik et al. |
| 2005/0149552 A1 | 7/2005 | Chan et al. |
| 2005/0187957 A1 | 8/2005 | Kramer et al. |
| 2005/0289072 A1 | 12/2005 | Sabharwal |
| 2006/0031757 A9 | 2/2006 | Vincent, III |
| 2006/0048218 A1 | 3/2006 | Lingafelt et al. |
| 2006/0048236 A1 | 3/2006 | Multerer et al. |
| 2006/0059128 A1 | 3/2006 | Ruggle et al. |
| 2006/0107046 A1 | 5/2006 | Raley et al. |
| 2007/0124797 A1 | 5/2007 | Gupta et al. |

OTHER PUBLICATIONS

Velegrakis, et al., "Preserving Mapping Consistency Under Schema Changes", Springer-Verlag, 2004, pp. 274-293.

Ferraiolo, et al, "A Role-Based Access Control Model and Reference Implementation within a Corporate Intranet", ACM Transactions on Information and System Security, vol. 2, No. 1, Feb. 1999, pp. 34-64.

Ferraiolo, et al, "Proposed NIST Standard for Role-Based Access Control", ACM Transactions on Information and System Security, vol. 4, No. 3, Aug. 2001, pp. 224-274.

Marriott, et al., "Management Policy Service for Distributed Systems", IEEE, 1996, pp. 2-9.

Schneider, "Enforceable Security Policies", ACM Transactions on Information and System Security, vol. 3, No. 1, Feb. 2000, pp. 30-50.

* cited by examiner

200

| Policy Library – Corporate Network Domain (sample) | 202 |
|---|---|
| Systems Policy Name | OU-LAB-ANTIVIRUS GPO |
| 222 — Published Policy Link | Http://Policies/AntiVirus/ |
| 224 — Association Date | 1/2/2001 |
| 226 — System Policy File Date | DC-01 (SYSVOL) 1/1/2001 |
| 228 — Required GPO Settings | NONE |
| 206 — Root | cn=Labs, dn=Corporate, dn=Company, dn=com |
| 208 — Purpose | To Enforce Antivirus deployment to lab systems |
| 210 — Filter (apply) To | Authenticated Users |
| 212 — Requested By | Lab Leadership Team |
| 214 — Request Date | 9/19/1999 |
| 216 — Expiration (TTL) Date | 5/6/2007 |
| 218 — Deployment Date | 1/1/2001 |
| 220 — Policy Contact | mailto:Identity.Management@Company.com |

Fig. 2

AUTOMATED POLICY CHANGE ALERT IN A DISTRIBUTED ENTERPRISE

BACKGROUND

Enterprises, such as corporations and other organizations, typically define policies for purposes of enterprise management. Enterprise management refers to the identification and management of users and network-based resources, such as computers. Typically, policies designate access to or configuration of resources. The enterprise policies define boundaries or scope of access permissions.

Enterprise policies are typically a combination of "business/security policies" and "systems policies". Business/security policies (also called "published policies") define general guidelines for access to network-based resources, including secure access, and restrictions on use. Published policies can be presented to business staff and visitors by means of electronically published media, such as Hyper Text Markup Language (HTML) or other text-based media. Systems policies present the mechanism for implementing the published policies into enforceable computer and user configurations. Available platforms provide architectures to implement systems policies. For example, WINDOWS ACTIVE DIRECTORY from MICROSOFT CORPORATION implements system policies using Group Policy Objects (GPOs).

Using conventional approaches, system policies can be conveniently configured in one-to-all, one-to-many, and one-to-specific arrangements with respect to users and electronic resources. In such approaches, corporate data portals (such as a network data share) host and present the various published policies of the enterprise. These portals also present approved exceptions to published policies, which are issued under certain situations to a limited number of staff or resources. In a distributed enterprise, each domain, or group of users and resources, typically has its own instance of the systems policies, which the domain uses to enforce the guidelines derived from published policies.

Unfortunately, securing and otherwise managing access to the network-based resources involves making and managing an increasing number of systems policies. As the number of systems policies increases, and the number of exceptions to published policies increases, it becomes difficult to immediately determine the associations of each published policy and policy exception to all systems policies. No automated systems exist to associate published policies to multiple instances of systems policies, to include publish policy exceptions into the associations, and to automate management of changes between published policies and systems policies and the distributed enterprise.

SUMMARY

Implementations of systems and methods described herein enable policy management such that published policies and published policy exceptions remain associated (linked) with systems policies within an enterprise. Any change to the published policies will notify an enterprise authority that changes may be needed to associated (linked) systems policies. A policy management solution stores information about the associated published policies and published policy exceptions, and systems policies. The policy management solution can use rules (logic) to determine when a published policy and systems policy association is not consistent, and can notify an enterprise authority that examination and separate repair may be required.

BRIEF DESCRIPTION OF THE FIGURES

FIG. 2 illustrates an exemplary policy library;

DETAILED DESCRIPTION

Described herein are various implementations of systems and methods for facilitating the association of published policies and systems policies in a distributed enterprise. In accordance with various implementations described herein, a systems policy relates to settings required to carry out a published policy. A published policy is any policy that specifies guidelines for entities within the enterprise. Published policies are related to systems policies in a one-to-many association or a one-to-one association. Policy exception is an allowed variance between published policy and systems policy for a limited number of staff or resources. Processes and systems described herein utilize the association(s) between systems policies and published policies and policy exceptions to determine the states of policy association. The states of policy association include an associated state that requires no additional associations, an unmatched state wherein published policies are not associated to systems policies and/or systems policies are not associated to published policies, and a changed state wherein changes to published policies and/or published policy exceptions may necessitate changes to systems policies, or changes to systems policies may necessitate changes to published policies, or where there are inconsistencies between published policies and published policy exceptions with regard to specific settings/values listed in associated systems policies.

In one implementation, a staff member in the information technology (IT) center receives the published policies and creates a listing of associations between the published policies, policy exceptions if any, and systems policies in the distributed enterprise. The policy association data is maintained in a policy management solution (policy library) that enables the IT center staff to review all policy associations.

Figure 1:
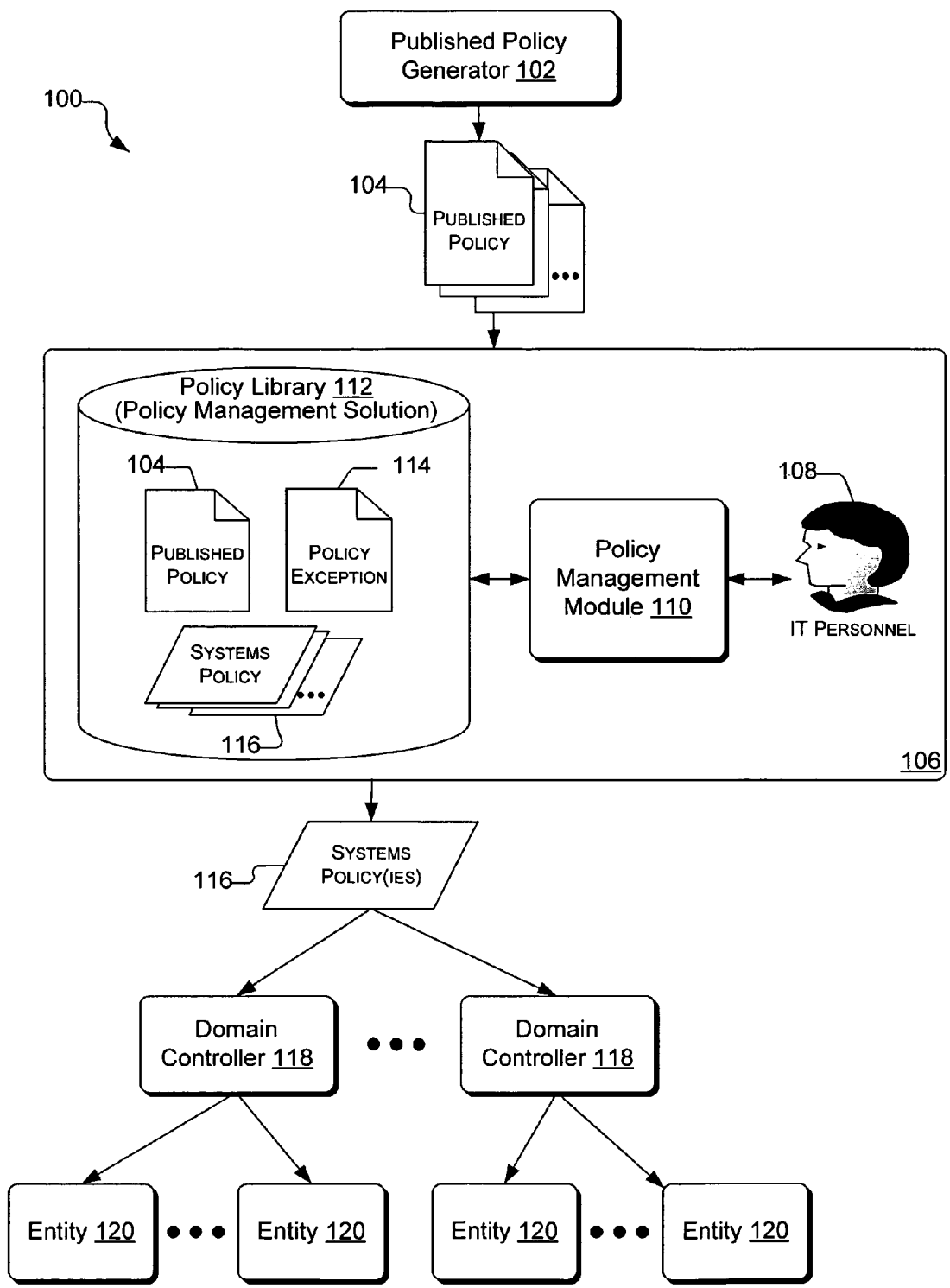
FIG. 1 illustrates an exemplary distributed enterprise wherein published policies, exceptions, and systems policies are employed.

FIG. 1 illustrates an exemplary distributed enterprise 100 wherein published policies are generated and implemented to enforce guidelines, procedures, and rules for enterprise management. As used herein, an enterprise is an organization, such as, but not limited to, a corporation, which includes entities, such as, but not limited to, computers, users, user accounts, files, application programs, printers, and other resources. Published policies set forth principles for managing access to, configuration of, and interaction among the entities. The enterprise 100 is distributed, meaning that the entities may be geographically dispersed from each other and responsibilities may be divided among entities and/or groups of entities. Typically, entities within the distributed enterprise 100 communicate via a communication network (not shown).

A published policy generator(s) 102 generates one or more published policies 104. One implementation of the published policy generator 102 includes one or more groups of entities with the enterprise 100 that create published policies regarding various aspects of the enterprise 100. For example, a human resources group may set forth published policies related to employee information, such as the format for employee name/identification. Similarly, a corporate security group may set forth published policies dictating when and how users are to access the computer network.

Exemplary published policies 104 include, but are not limited to the following:

User passwords minimum length.
User passwords complexity.
User passwords periodic update requirement (e.g., at least once every seventy days).
Default basic rights for each user to access specified default network resources.

The published policies 104 are published somewhere within the enterprise 100. Typically, the published policies 104 are published in electronic form, whereby the published policies 104 can be made available on a network, such as an intranet. The published policies may be in the form of a database, a spreadsheet, a HyperText Markup Language (HTML) page, or a simple text data file (ASCII file, comma-separated value file, or similar Unicode text file).

The published policy generator 102 communicates (e.g., via a network) the one or more published policies 104 to an information technology center 106, which manages systems policies within the enterprise 100. Typically, the IT center 106 includes IT personnel 108 and a policy management module 110, which perform various processes for managing and implementing the published policies 104. IT personnel 108 include, by way of example, but not limitation, system administrators and system security personnel.

In one implementation, the policy management module 110 is embodied in a server computer through which the IT personnel 108 manage the enterprise policies. In this implementation, the policy management module 110 is used to enter the policy associations data into a policy management solution (policy library) 112. The policy library 112 may reside in computer memory, a database, or other storage devices in communication with the policy management module 110. By way of example, but not limitation, the policy library 112 can be implemented in a structured query language (SQL) database on a server computer. Any policy-related data can be stored in the policy library 112 as may be suitable to a particular implementation. Exemplary policy library data are shown in FIG. 2, and discussed further below.

In accordance with one implementation of the IT center 106, the policy library 112 lists the associations between published policies 104, one or more published policy exceptions 114, and systems policies 116. Systems policies 116 represent implementation data or settings required to implement or carry out the published policies 104. Thus, one or more systems policies 116 may correspond to each published policy 104. In addition, systems policies 116 that are not in exact compliance with the published policies 104, but are nonetheless allowable systems policies 116, may be associated with corresponding published policy exception(s) 114. Policy exceptions 114 are discussed in further detail below.

Systems policies 116 are configured policies that represent the implementation of the published policies 104 and published policy exceptions 114. System policies 116 are applied to domains and entities within the enterprise 100 to enforce the published policies 104. For example, a systems policy 116 may contain configuration information, instructions, settings, application program instructions, and the like, which configure a user's computer in accordance with published policies 104. The systems policies 116 are typically provided in a container (e.g., file) in a predetermined format. An exemplary systems policy 116 for use in a Group Policy Object in MICROSOFT CORPORATION'S ACTIVE DIRECTORY is shown below:

Example of Two Specific Policies for
   a) Account Policies/Password Policy—6 settings
   b) Account Policy/Account Lockout Policy—3 settings

| Computer Configuration [Enabled] Windows Settings Security Settings | |
|---|---|
| Policy | Setting |
| Account Policies/Password Policy | |
| Enforce password history | 24 passwords remembered |
| Maximum password age | 70 days |
| Minimum password age | 1 days |
| Minimum password length | 14 characters |
| Password must meet complexity requirements | Enabled |
| Store passwords using reversible encryption | Disabled |
| Account Policies/Account Lockout Policy | |
| Account lockout duration | 0 minutes |
| Account lockout threshold | 5 invalid logon attempts |
| Reset account lockout counter after | 30 minutes |

Detailed Example of an Active Directory Domain Systems Policy

Managed Forest Default Domain Policy
Data collected on: Oct. 18, 2004   show all
5:21:59 PM
Generalhide

| Detailsshow | |
|---|---|
| Domain | test.microsoft.com |
| Owner | Test\Domain Admins |
| Created | Oct. 18, 2004 3:14:32 PM |
| Modified | Oct. 18, 2004 3:34:46 PM |
| User Revisions | 1 (AD), 1 (sysvol) |
| Computer Revisions | 205 (AD), 205 (sysvol) |
| Unique ID | {0C46799D-0866-4A7E-9E04-C8D697EA9C0F} |
| GPO Status | Enabled |

| Linksshow | | | |
|---|---|---|---|
| Location | Enforced | Link Status | Path |
| Managed | No | Enabled | test.microsoft.com/Managed |

This list only includes links in the domain of the GPO.

Security Filteringshow

The settings in this GPO can only apply to the following groups, users, and computers:
Name
NT AUTHORITY\Authenticated Users

| Delegationshow | | |
|---|---|---|
| These groups and users have the specified permission for this GPO | | |
| Name | Allowed Permissions | Inherited |
| test\Domain Admins | Edit settings, delete, modify security | No |
| test\Enterprise Admins | Edit settings, delete, modify security | No |
| NT AUTHORITY\Authenticated Users | Read (from Security Filtering) | No |

-continued

| | | |
|---|---|---|
| NT AUTHORITY\ENTERPRISE DOMAIN CONTROLLERS | Read | No |
| NT AUTHORITY\SYSTEM | Edit settings, delete, modify security | No |

Computer Configuration (Enabled)hide

Windows Settingshide
Security Settingshide
Account Policies/Password Policyhide

| Policy | Setting |
|---|---|
| Enforce password history | 24 passwords remembered |
| Maximum password age | 70 days |
| Minimum password age | 1 days |
| Minimum password length | 14 characters |
| Password must meet complexity requirements | Enabled |
| Store passwords using reversible encryption | Disabled |

Account Policies/Account Lockout Policyhide

| Policy | Setting |
|---|---|
| Account lockout duration | 0 minutes |
| Account lockout threshold | 5 invalid logon attempts |
| Reset account lockout counter after | 30 minutes |

Account Policies/Kerberos Policyshow

| Policy | Setting |
|---|---|
| Enforce user logon restrictions | Enabled |
| Maximum lifetime for service ticket | 600 minutes |
| Maximum lifetime for user ticket | 10 hours |
| Maximum lifetime for user ticket renewal | 7 days |
| Maximum tolerance for computer clock synchronization | 5 minutes |

Local Policies/Audit Policyshow

| Policy | Setting |
|---|---|
| Audit account logon events | Success, Failure |
| Audit account management | Success, Failure |
| Audit directory service access | Failure |
| Audit logon events | Success, Failure |
| Audit object access | Failure |
| Audit policy change | Success, Failure |
| Audit privilege use | Failure |
| Audit process tracking | Failure |
| Audit system events | Success, Failure |

In a particular implementation of the policy management module 110, systems policies 116 are deployed to one or more domain controllers 118, from which they can be applied to various entities 120 within the enterprise 100. A domain controller 118 is typically embodied in a server computer and manages access to a set of network resources (e.g., applications, printers, user accounts and so forth) for a group of entities 120. For example, when deployed to the domain controllers 118, the systems policies 116 may enforce password requirements (e.g., number of characters, complexity, frequency of password update, etc.), logon requirements or limitations, resource access requirements or limitations, and others.

As discussed above, entities 120 include, but are not limited to, users, computers, user accounts, files, application programs, printers and other resources that may access or be accessed from the enterprise network. As shown, the entities 120 are typically arranged in groups that are associated with domains. The domain controller 118 for each domain uses a system policy or policies 116 associated with that domain to manage the access by entities 120 to other network-based entities.

In a particular implementation of the distributed enterprise 100, the domain controllers 118 and entities 120 are identified and managed using ACTIVE DIRECTORY by MICROSOFT CORPORATION. In this implementation, the domain controllers 118 maintain an identity store (not shown) having metadata that identifies the entities in the domain, and other domains. The ACTIVE DIRECTORY also includes Group Policy Objects (GPOs) that represent the systems policies 116. Using ACTIVE DIRECTORY, the published policies 104 and policy exceptions 114 can be implemented with standard GPOs and alternate GPOs, respectively.

As the enterprise 100 grows and changes, the policies will be updated to adapt to such growth and changes. Managing changes to policies is preferably controlled in a manner that ensures the viable, secure, ongoing operation of the enterprise 100. The published policies 104 can be updated and new published policies 104 added. At times, published policy exceptions will be granted to users and/or resources in the enterprise for a limited duration of exception. In addition, existing systems policies 116 can be updated in response to conditions in the enterprise domains. Throughout this life cycle of the enterprise 100, IT personnel 108 enter associations between published policies 104, published policy exceptions 114, and systems policies 116. In this implementation, the policy management solution (policy library) 112 has an association inspection mechanism within the policy management module. When an existing association has been examined, and determined unmatched, changed, or inconsistent, the policy management module 110 alerts IT personnel 108 to take action, such as remove or edit the affected published policies and systems policies.

An Associated State exists at the point of associating (linking) a published policy, possibly a published policy exception, and a systems policy. The association captures the date of the association, the date of the systems policy file, the date that the published policy was posted, the date of any published policy exception, and any Time To Live (TTL) value. In some situations, specific systems policy settings may also be added to the association data. An associated state exists while there are no changes to any association data upon inspection.

An Unmatched State exists when a published policy in the policy library 112 is not associated to any systems policy, or when a systems policy in the policy library 112 is not associated to any published policy or published policy exception. When the policy management module 110 performs an inspection of all associations in the policy library 112 and determines that an unmatched state exists, an alert is dispatched to IT personnel 108. IT personnel 108 can then take action, for example, by removing or editing the association data.

A Changed State exists when changes to published policies, published policy exceptions or systems policies are determined upon inspection of the association data (dates and settings). When the policy management module 110 performs an inspection of all associations in the policy library 112, and determines a changed state exists, an alert is dispatched to IT personnel 108. IT personnel 108 can then take action, for example, by removing or editing the association data.

In accordance with one implementation of the policy library 112, a published policy or systems policy can have limited time duration, meaning that the policy is applicable for only a limited time. Time-limited policies may be particularly relevant to policy exceptions 114, but may also apply to published policies 104 and systems policies 116. When a policy is time-limited, the policy is said to have a "time-to-live" (TTL). The policy library 112 maintains TTL data in the form of an expiration date, which may be used by the policy management module 110 to alert IT personnel 108 when a policy expires. In response to the alert the IT personnel 108 can take action, for example, by removing or editing the expired policy.

Figure 4:
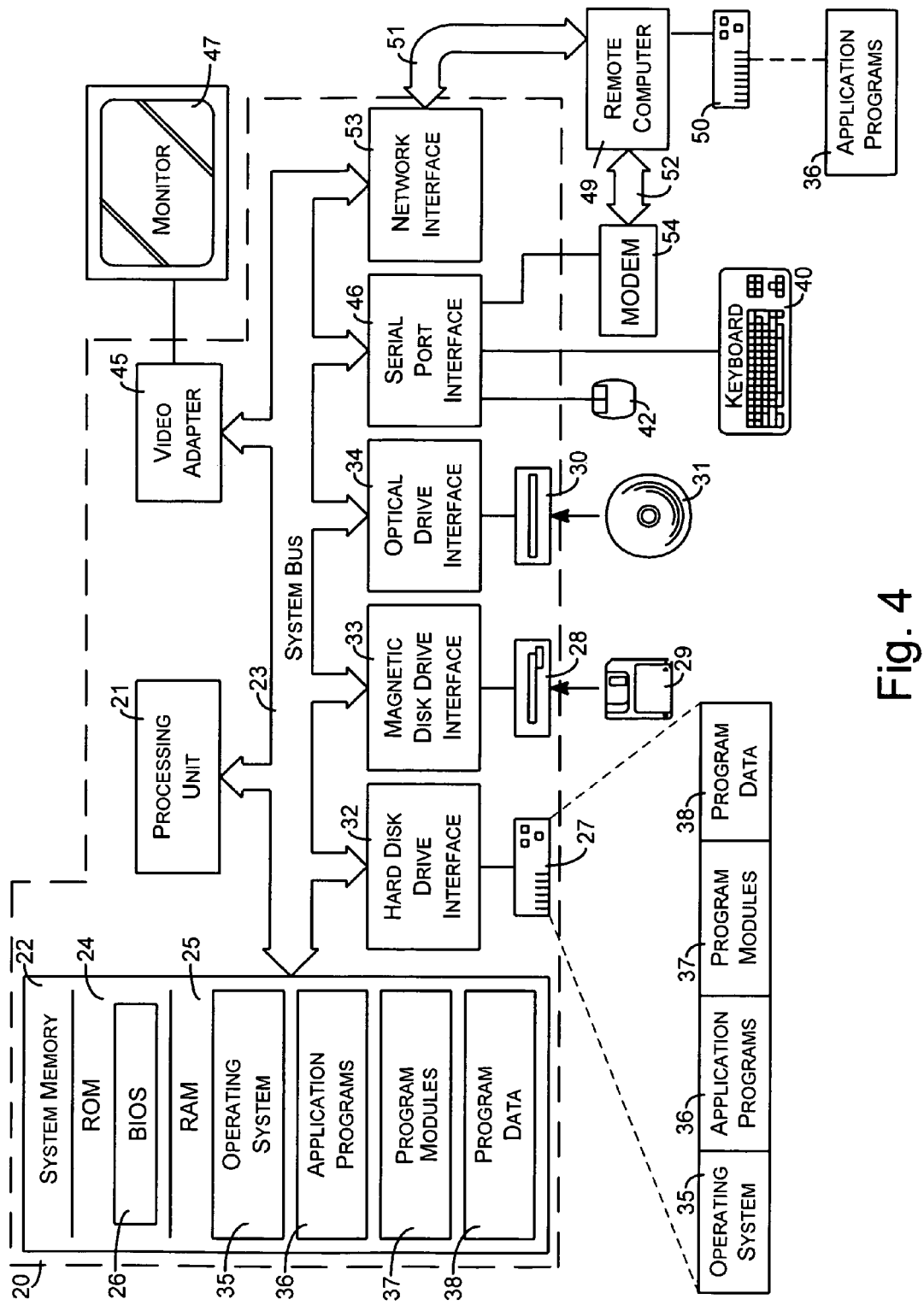
FIG. 4 illustrates a general purpose computer and environment that can be used to implement policy management systems and processes.

Modules (e.g. policy management module 110, domain controller 118, entities 120) shown in FIG. 1 may be implemented with any of various types of computing devices known in the art, depending on the particular implementation, such as, but not limited to, a desktop computer, a laptop computer, a personal digital assistant (PDA), a handheld computer, or a cellular telephone. The computing devices typically communicate via a network (not shown), which may be wired or wireless. In addition, the computing devices may be arranged in any convenient configuration, such as, but not limited to client/server and peer-to-peer configurations. Modules shown in FIG. 1 can be implemented in software or hardware or any combination of software or hardware. FIG. 4, discussed in detail below, illustrates a computing environment that may be used to implement the computing devices, applications, program modules, networks, and data discussed with respect to FIG. 1.

FIG. 2 illustrates exemplary metadata that describe systems policies. The metadata is in the form of attributes 200 from an exemplary policy library. The exemplary policy library attributes 200 are for illustrative purposes and are not intended to limit the scope of the claimed subject matter in any way. Thus, while the illustrated policy library attributes 200 relate to a corporate network domain, the policy library attributes of other implementations may relate to other domains. In addition, other implementations of policy libraries may include more, fewer, or different policy data/attributes than are shown in the exemplary policy library attributes 200.

The policy library attributes 200 may be stored in a relational database or other memory and presented to a user in a format such as the tabular format in FIG. 2, or in any other convenient format. As shown, the exemplary policy library attributes 200 are presented in a two-column table and grouped by policy name. For example, a first policy 202 is named "OU-LAB-ANTIVIRUS GPO".

The exemplary attributes include a root domain 206, a purpose 208, a filter 210, a requestor identifier 212, a request date 214, an expiration date 216, a deployment date 218, and a policy contact 220. The root domain 206 attribute indicates a primary domain name, directory name, OU, or site name to which the policy relates. The purpose attribute 208 is a brief description of the purpose for the systems policy. The filter attribute 210 is a brief description of the users in the enterprise to whom the systems policy applies. The requestor attribute 212 identifies the entity, user, or group who requested the systems policy. The request date 214 indicates when the systems policy was requested. The deployment date 218 is a date when the systems policy was deployed. The policy contact 220 indicates contact information related to the systems policy.

With particular regard to the expiration date 216, a date can be provided that corresponds to when the systems policy will expire. The expiration date 216 can be used for "life cycle" management of the systems policy. For life cycle management, it is often necessary to determine when systems policies should be updated or removed from deployment. Considerations that may be relevant to determining the expiration date are:

systems policy no longer corresponds to any published policies.

systems policy is no longer required by the original requestor.

systems policy must be updated in or removed from the existing IT environment.

The association data in the policy library depicted in FIG. 2 includes values for published policy link 222, the date of association 224, the systems policy file date 226 for a systems policy file on a particular domain controller 118, and optionally, any required systems policy settings 228 (values) that must appear on the domain controllers 118 and enterprise clients 120. The published policy link 222 is typically a Hypertext Markup Language (HTML) Uniform Resource Locator (URL) intranet publishing point for the policy documentation published by the published policy generator 102. The date of association 224 is the date that association data was recorded by a member of the IT personnel 108 linking published policies, published policy exceptions, and systems policies. The systems policy file date 226 is the Last Modified value on a systems policy file typically published to common-access network file share, available to entities 120 across the distributed enterprise. The (optional) required systems policy settings 228 describe specific settings (values) that must appear in system policy files 116 on the domain controllers 118 and entities 120 across the distributed enterprise.

In a particular implementation of a policy "life cycle" process, the policy library is automatically queried for expiration dates (TTL values) 216. For policies that include an expiration date, an alert is sent to IT personnel on or before the expiration date to notify the IT personnel that the expiration of the policy is imminent. In response, the IT personnel can take some action with respect to the policy, such as updating and/or removing the systems policy. Such removal or clean-up of expired policies can help ensure that the policy library 112 (FIG. 1) and domain controllers 120 (FIG. 1) do not become cluttered with forgotten, unused, and often inconsistent policies, and ensures that the user experience is consistent with current published policy.

Exemplary Operations

Figure 3:
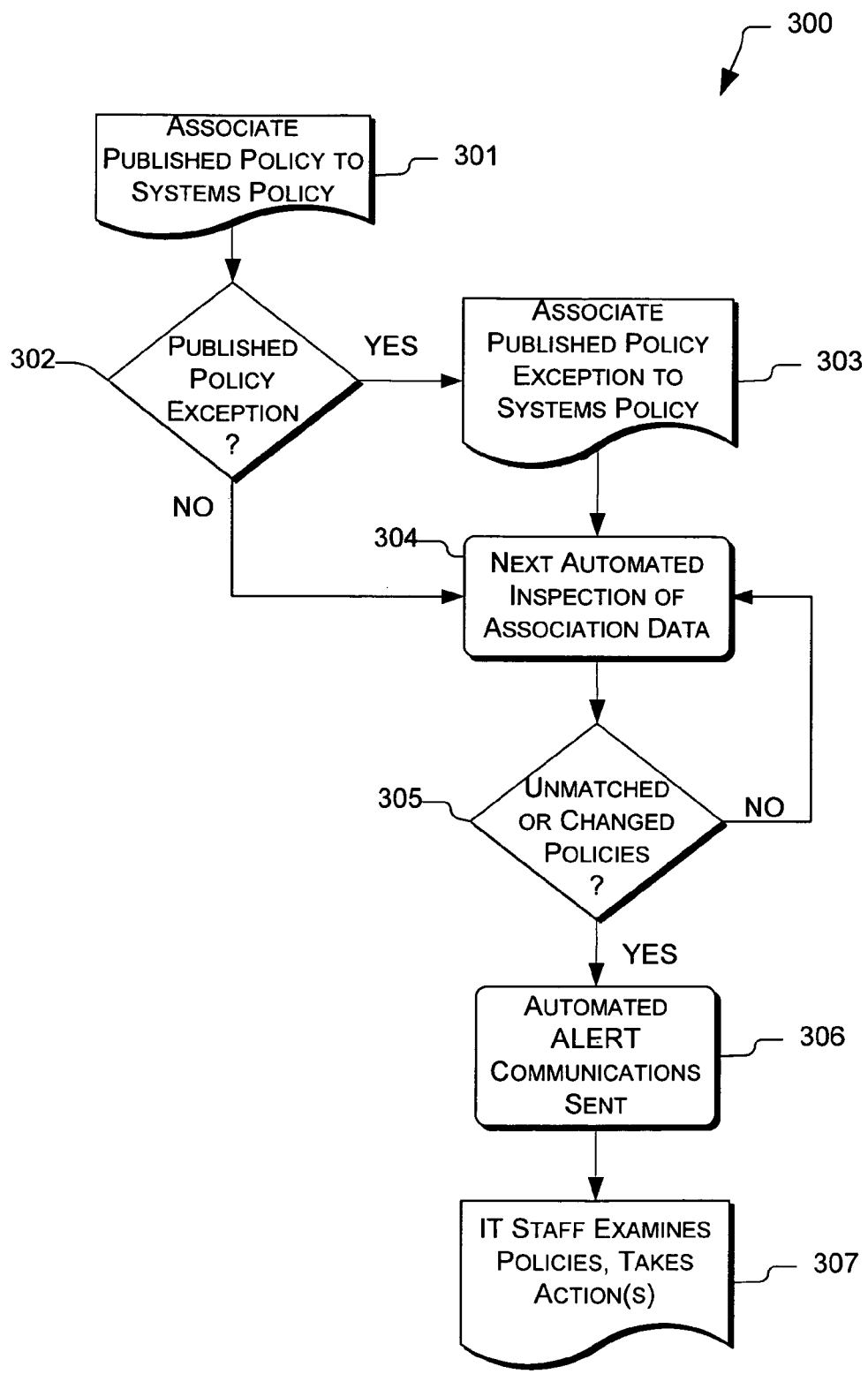
FIG. 3 illustrates an exemplary process for creating association data in a policy library and for automating the inspection of and alerting on inconsistencies with data in the policy library.

FIG. 3 illustrates an exemplary policy association and alerting process 300 for automating the notification (alerts) on unmatched and changed published policies, published policy exceptions, and systems policies. The policy association and alerting process 300 can be carried out by the systems shown in FIG. 1 and FIG. 2. Alternatively, the policy association and alerting process 300 can be carried out by systems other than those shown in FIG. 1 and FIG. 2. It is assumed that systems policies have been applied in an enterprise.

An associating operation 301 is conducted by the IT personnel 108 wherein the IT personnel use the policy management module 110 to associate published policies 104 to systems policies 116, and record the association into a policy library 112. As part of the associating operation 301, the date of the association, the date of the systems policy file, the date that the published policy was posted, and any Time To Live (TTL) value is captured into the policy library 112 by the IT personnel 108. In some situations, specific systems policy 116 settings may also be added to the association data by the IT personnel 108.

An analyzing operation 302 is performed by the IT personnel 108 to determine if any published policy exceptions 114 exist for a specific published policy 112. If exception(s) exist, the operation branches to an associating operation 303 and the date of any published policy exception, and any Time To Live (TTL) value, is captured into the policy library 112 by the IT personnel 108. If no exception(s) exist, the operation branches to an inspection operation 304.

An automated, scheduled inspection operation 304 compares the association data in the policy library 112 to published policies 104, the published policy exceptions 114, and the systems policies 116 on the domain controllers 118.

An analyzing operation 305 determines if there is inconsistency with the association data and all policies. If no inconsistencies are determined, the operation returns to the next scheduled instance of an inspection operation 304. If inconsistencies are determined, the operation branches to an automated alerting operation 306.

An alerting operation 306 prepares a notification to be sent to IT personnel 108 that describes the inconsistency between the association data in the policy library 112 and all policies. The notification is typically sent to the IT personnel in the form of email, and identifies the affected published policy 104, any affected published policy exception 114, the affected systems policy 116, and the assessed state of the inconsistency. The assessed state of the inconsistency may be unmatched (unassociated published or systems policy), date changed between association data in the policy library 112 and the published policy 104, published policy exception 114, or systems policy 116. The changed state is also assessed for a systems policy with an expired (exceeded) Time To Live (TTL) date, or a systems policy 116 that has settings inconsistent with the association data in the policy library 112.

An inspection operation 307 is conducted by a member of the IT personnel 108 who will take action based on the assessed state and inconsistencies reported in the automated alert. Such actions may include contacting the policy generator 102 to have published policies 104 updated, or obtaining and recording a published policy exception 114, updating the association data in the policy library 112 to reflect a change in the enterprise, and/or updating or removing a systems policy 116 to reflect a change in the enterprise.

Exemplary Computing Device

With reference to FIG. 4, an exemplary system for implementing the operations described herein includes a general-purpose computing device in the form of a conventional personal computer 20, including a processing unit 21, a system memory 22, and a system bus 23. System bus 23 links together various system components including system memory 22 and processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system 26 (BIOS), containing the basic routine that helps to transfer information between elements within the personal computer 20, such as during start-up, is stored in ROM 24.

As depicted, in this example personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM, DVD, or other like optical media. Hard disk drive 27, magnetic disk drive 28, and optical disk drive 30 are connected to the system bus 23 by a hard disk drive interface 32, a magnetic disk drive interface 33, and an optical drive interface 34, respectively. These exemplary drives and their associated computer-readable media provide nonvolatile storage of computer readable instructions, data structures, computer programs and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs), read only memories (ROMs), and the like, may also be used in the exemplary operating environment.

A number of computer programs may be stored on the hard disk, magnetic disk 29, optical disk 31, ROM 24 or RAM 25, including an operating system 35, one or more application programs 36, other programs 37, and program data 38. A user may enter commands and information into the personal computer 20 through input devices such as a keyboard 40 and pointing device 42 (such as a mouse).

Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, a universal serial bus (USB), etc.

A monitor 47 or other type of display device is also connected to the system bus 23 via an interface, such as a video adapter 45. In addition to the monitor, personal computers typically include other peripheral output devices (not shown), such as printers.

Personal computer 20 may operate in a networked environment using logical connections to one or more remote computers, such as a remote computer 49. Remote computer 49 may be another personal computer, a server, a rooter, a network PC, a peer device or other common network node, and typically includes many or all of the elements described above relative to the personal computer 20.

The logical connections depicted in FIG. 4 include a local area network (LAN) 51 and a wide area network (WAN) 52. Such networking environments are commonplace in offices, enterprise-wide computer networks, Intranets and the Internet.

When used in a LAN networking environment, personal computer 20 is connected to local network 51 through a network interface or adapter 53. When used in a WAN networking environment, the personal computer 20 typically includes a modem 54 or other means for establishing communications over the wide area network 52, such as the Internet. Modem 54, which may be internal or external, is connected to system bus 23 via the serial port interface 46.

In a networked environment, computer programs depicted relative to personal computer 20, or portions thereof, may be stored in a remote memory storage device. It will be appreciated that the network connections shown are exemplary and other means of establishing a communications link between the computers may be used.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of various modules and techniques described herein may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Although an exemplary operating embodiment is described in terms of operational flows in a conventional computer, one skilled in the art will realize that the present invention can be embodied in any platform or environment that processes and/or communicates video signals. Examples include both programmable and non-programmable devices such as hardware having a dedicated purpose such as video conferencing, firmware, semiconductor devices, hand-held computers, palm-sized computers, cellular telephones, and the like.

Although some exemplary methods and systems have been illustrated in the accompanying drawings and described in the foregoing Detailed Description, it will be understood that the methods and systems shown and described are not limited to the particular implementation described herein, but rather are capable of numerous rearrangements, modifications and substitutions without departing from the spirit set forth herein.

What is claimed is:

1. A method for automating management of policies in a distributed enterprise, the method comprising:
   receiving one or more prospective published enterprise policies from one or more publishing portals within the enterprise;
   receiving one or more system policies from one or more directory service databases;
   maintaining a policy expiration time value for each of the one or more system policies;
   associating the one or more system policies to each received prospective published enterprise policy;
   examining the associations between the system policies and the prospective published enterprise policies;
   determining associations that would be unmatched, changed, or inconsistent based on the one or more prospective published enterprise policies;
   generating an alert in an event that the one or more system policies would be unmatched, changed, or inconsistent based on the one or more prospective published enterprise policies; and
   generating an alert in an event one or more system policies would expire in response to examining the associations between the systems policies and the prospective published enterprise policies.

2. One or more computer-readable storage media having computer-executable instructions that, when executed, cause a processor to perform a method, the method comprising:
   maintaining associations between a published policy and a system policy in a database;
   maintaining a policy expiration time value for the system policy;
   determining whether a prospective change to the published policy affects the system policy, wherein the determining comprises determining what specific change to the system policy would implement the prospective change to the published policy and determining whether the system policy will be orphaned as a result of the prospective change to the published policy;
   generating an alert when the prospective change is determined to affect the system policy; and
   generating an alert when the system policy would expire in response to implementing the prospective change to the published policy.

3. One or more computer-readable storage media as recited in claim 2, the method further comprising maintaining a list of generated alerts in a database.

4. One or more computer-readable storage media as recited in claim 2, wherein the determining further comprises determining whether the system policy will be invalidated as a result of the prospective change to the published policy.

5. One or more computer-readable storage media as recited in claim 2, the method further comprising:
   storing an expiration date for the system policy; and
   generating an alert if the prospective change will cause the expiration of the date of the system policy.

6. One or more computer-readable storage media as recited in claim 2, the method further comprising:
   storing an expiration date for a published policy exception; and
   generating an alert if the prospective change will cause the expiration of the system policy.

7. One or more computer-readable media as recited in claim 2, wherein the one or more systems policies comprise one or more group policy objects.

8. A computer comprising the one or more computer-readable storage media recited in claim 2.

* * * * *